United States Patent Office 3,384,700
Patented May 21, 1968

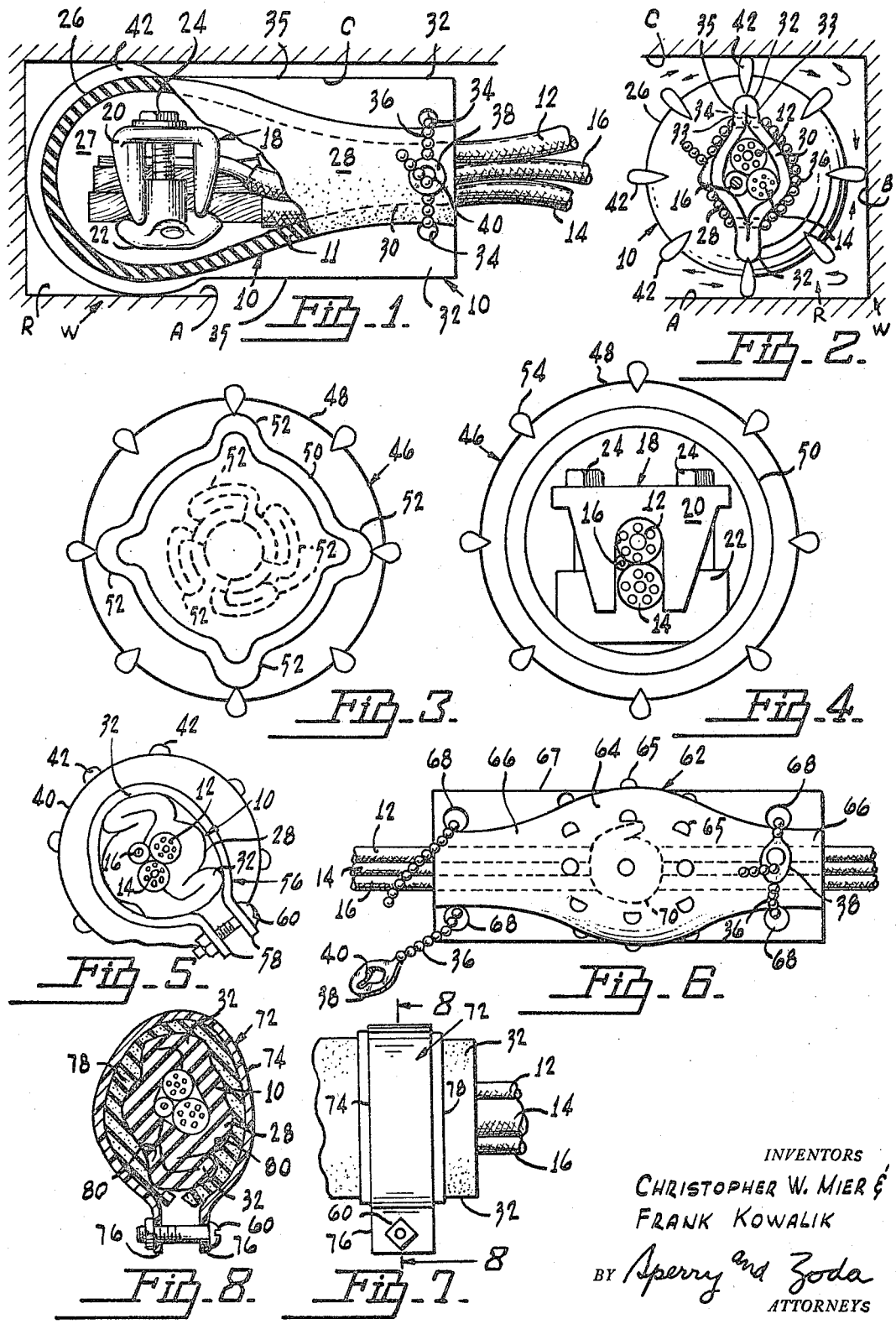

3,384,700
SPLICE INSULATING DEVICE OF THE
HEAVY DUTY TYPE
Christopher W. Mier, 447 Norway Ave. 08629, and
Frank Kowalik, 112 Birch 08610, both of Trenton,
N.J.
Filed Apr. 19, 1966, Ser. No. 543,734
8 Claims. (Cl. 174—5)

ABSTRACT OF THE DISCLOSURE

A pouch-like body formed of flexible, electrically insulative material encloses a heavy-duty electrical cable splice. The wall of the body is molded to assume a configuration defining radial wings angularly spaced about an open end of the body. These spread resiliently, yieldably for insertion of the splice. The inherent tensioning of the wings partially contracts the open end about the cables, after which a radially contractable tie or clamp fully closes the end about the cables, causing the wall material to enter crevices between the cables. Projections on the pouch space the body from adjacent surfaces.

---

This invention relates generally to electrical splices. More particularly, the invention relates to a protective, electrically insulative covering for heavy duty splices, of the type shown in our Patent No. 3,209,061 issued Sept. 28, 1965.

By way of background, it may be noted that heavy duty entrance cables of the wiring systems of office buildings or the like are spliced by means of rugged, specially designed clamping devices of substantial size. Normally, after splicing of the cables it is necessary to enclose the splice with a protective, heavy wrap of insulating material. In some areas of the country, this is called a "bug."

To apply the insulating covering involves a laborious, time-consuming procedure involving wrapping of the splice with a long length of insulating tape until eventually, a thick, weatherproof splice cover is produced. Application of the tape often involves as much as a full half-hour's work on the part of the electrician. It can thus be readily seen that the present practice employed for insulating and protectively enclosing a heavy duty cable splice leaves much to be desired, due to its exceedingly costly nature, not only in respect to the expenditure of skilled labor, but also in respect to the excessive amount of electrical tape needed for the covering.

It is, accordingly, the main object of the present invention to provide a splice cover or insulating device that will be relatively inexpensive and will be capable of being applied swiftly and easily.

To this end, the invention, summarized briefly, comprises a molded, flexible splicing sleeve or pouch formed of an electrically insulative material such as rubber, polyvinyl chloride or the like, having a bulbous part merging into a reduced end portion. In one form of the invention, the insulating device is closed at one end, for protectively enclosing a pigtail splice. In another form, the invention is open at both ends, having a bulbous center part merging into reduced ends at opposite sides thereof, to receive a through splice.

The invention, in this connection, constitutes an improvement over the device shown in our patent, in that the present invention comprises a single covering member, rather than a covering that includes separate inner and outer covering members as in our Patent 3,209,061.

Further, in accordance with the present invention, we dispense with the slit in the reduced end portion, to simplify manufacture and reduce the cost of said manufacture. In accordance with the present invention, we leave the covering member devoid of slits or the like, and accomplish temporary spreading of the reduced end portion to receive the heavy duty splice through the provision of preformed wings which are initially molded in such a fashion as to normally tend to close the end or mouth portion. The wings, however, are quickly and easily spreadable, to permit the passage of the heavy duty splice into the bulbous center part, after which the wings, of their own accord, tend to return to their initial position. Then, a simple tie or clamp element is applied swiftly and easily to the reduced end portion, so as to maintain the same in closed, cable-gripping condition.

Still another object is to provide means applicable to the reduced end portion that will particularly facilitate the deformation of the flexible material of the covering member, in a fashion such as to cause it to close tightly about a plurality of cables, the material of the mouth portion flowing, as it were, into the interstices appearing between adjacent cables.

Other objects will appear from the following description, the claims appended thereto, and from the annexed drawings, in which like reference characters designate like parts throughout the several views, and wherein:

FIG. 1 is a view of an insulating device according to the present invention, said device being shown partly in side elevation and partly in longitudinal section, in a splice-enclosing position, the device being shown in a recess of a building structure in a typical installation;

FIG. 2 is a view of the insulating device of FIG. 1, as seen from the right of FIG. 1;

FIG. 3 is a modified form of insulating device, wherein four wings are provided, so as to provide maximum distension of the mouth portion in relation to the extent to which said mouth portion can be closed when in its installed condition, the device being shown in full lines in its normal condition and in dotted lines in its contracted, installed condition;

FIG. 4 is an end view of the device of FIG. 3, with the mouth portion distended to receive an insulating splice during the installation procedure;

FIG. 5 is an end view of the device shown in FIG. 1, a portion being broken away, illustrated in association with a different type of clamp or tie element;

FIG. 6 is a side elevational view of a modified construction, adapted to receive a through splice;

FIG. 7 is a fragmentary side elevational view of the mouth portion of a splice-enclosing device of the type shown in FIG. 1, with another form of clamp applied thereto; and FIG. 8 is a sectional view substantially on line 8—8 of FIG. 7.

Referring to the drawing in detail, and in particular to FIGS. 1 and 2, we show in these figures of the drawing a splice-enclosing, insulating device generally designated 10. Said device includes a body 11 formed from a single piece of flexible, electrically insulative material such as rubber, polyvinyl chloride or the like. In a preferred embodiment, we have found that polyvinyl chloride, on the order of approximately ⅛" thick over its entire area, is well suited for the purposes of the present invention, and will not break down electrically until the breakdown voltage applied therethrough reaches 10,000 volts AC, approximately. This is far in excess of the requirements that need to be met, in connection with splices of the type to which the invention is applied.

In any event, the insulating device 10, comprised of the one-piece body 11, is adapted to enclose a splice which in FIGS. 1 and 2 is illustrated as being of the pigtail type. Said splice, thus, includes heavy duty cables 12, 14, 16, the ends of which are stripped, and in longitudinally contacting relation are held together by a splicing device generally designated 18. The splicing device 18 comprises cooperating clamp elements 20, 22, drawn toward each other into cable-gripping relation by means of bolts 24 passing through clearance openings of clamp element 20 and threadedly engaged in complementarily threaded recesses of the clamp element 22. The splicing device 18 is completely conventional, and capable of being purchased on the open market, and hence will not be described in further detail hereinafter. It may be observed, in this regard, that devices of this type take various forms and shapes, but in general have a common characteristic wherein they are of substantial size and of angular shape, thus producing considerable complications in respect to the task of protectively insulating the same after the splice has been made.

In any event, the body 11 of the insulating device 10 constituting the present invention comprises a generally rounded bulbous portion 26, which is provided with a correspondingly shaped cavity 27 receiving the splice 18. The bulbous portion 26 is formed as the major portion of a sphere, and merges into a generally elongated reduced end portion or mouth portion 28. Mouth portion 28 comprises a body part 30 of generally circular cross-section, integrally formed with diametrically opposed wings 32. Each wing 32 comprises a radially outwardly directed portion of the wall of the body, folded upon itself so as to define, on each wing, confronting, spreadable walls 33 integrally joined along their outer edges as at 35. The outer edges 35 of the wings are straight, extending in parallel relation to the longitudinal axis of the insulating device as shown in FIG. 1, and accordingly, in view of the tapering formation of the end portion 28 as it extends from the bulbous portion 26, the wings are progressively increased in width in a direction extending longitudinally of the wings away from the bulbous portion 26, that is, the wings increase progressively in a dimension taken radially of the mouth portion 28.

Formed in the confronting walls 33 of each wing, adjacent the open end of the insulating device, are registered openings 34, adapted to receive a removable tie element 36.

The tie element 36 shown in the drawing is conventional per se, and comprises a flexible plastic bead chain, molded at one end with a flat eye 38 having a keyhole slot 40. The keyhole slot is so proportioned that the larger end thereof is adapted to permit free movement of the beaded length of the tie element. When the tie element has been passed through openings 34 in the manner shown in FIGS. 1 and 2, it is drawn tight so as to contract the mouth portion 28 tightly about the cable 12, 14, 16. Then, when it has been pulled as tight as possible, it is drawn down into the reduced end of the keyhole slot. Due to the beaded formation of the chain, it will be locked in this portion of the slot in the manner shown in FIG. 1.

It will be apparent that a protective device formed as illustrated and described above is extremely desirable, in that it completely eliminates the necessity of wrapping the splice with a long length of tape to provide the previously referred to "bug." This time-consuming laborious procedure is obviously expensive, in view of the high cost of the labor of mechanics working in the field of electrical wiring of building structures. In the illustrated example, the insulating device is applied merely by spreading of the wings, to insert the pigtail splice. The wings, in fact, are spreadable by the device itself, as it enters, in large degree, requiring little or no assistance from the fingers of the hand in opening up the mouth portion to insert the splice.

When the splice has been fully inserted as in FIG. 1, one need merely extend the tie element through the openings 34 as described above, after which the tie element is drawn tight and permanently retained in its tightened condition by passage of the chain into the reduced end of the keyhole slot.

Of importance, also, is the fact that the insulation about the splice is of uniform thickness throughout. When a mechanic wraps tape around a splice, it is entirely possible that in some areas, the tape wrapping will be thinner than in other areas, and may be inadequate to prevent voltage passing therethrough. In other words, since the tape is not wrapped in a uniform fashion due to the angular shape of the splice, voltage breakdowns can and do occur at points in which the wrapping is too thin. Obviously, the worker has no way of knowing, except by experience, whether he has wrapped enough tape around every area of the splice to insure that the splice is fully insulated, and will not break down below minimum required values.

In the form of the invention shown in FIGS. 1 and 2, we provide integrally molded projections 42 on the bulbous part 26. In the illustrated example, these projections are in the form of elongated ribs, extending diametrically of the bulbous portion 26, so as to extend completely over the greatest area of said bulbous portion whereby said ribs will project outwardly from the closed end of the device, and also will project outwardly from the side wall of the device at the point of greatest diameter thereof.

By reason of this arrangement, the molded-on projections serve not only to stiffen the bulbous part somewhat whereby to hold it outwardly from the splice, but also, said ribs more importantly serve as spacers between the insulating device and adjacent surfaces A, B, C of a wall W of the building structure. In the illustrated example, the wall surfaces of the building structure define a recess R, in which the insulating device is forced. These cramped areas and cavities are often the only places into which the insulating device can be positioned, in some buildings, and a problem is encountered in that air circulation around the insulating device is not always assured. Such circulation is of importance to prevent drying out of the insulating covering, and as will be noted, from the directional arrows showing air flow in FIG. 2, the projections or ribs 42 effectively serve to space the device outwardly from any adjacent wall of the building structure, thereby to permit air to circulate freely around the largest portion of the insulating device.

Reference should now be had to FIGS. 3 and 4, showing a modified insulating device generally designated 46. This, as in the first form of the invention, has a bulbous part 48, similar to that shown in FIG. 1, and merging into a mouth portion 50 similar to the portion 28 in the first form of the invention. This form of the invention differs only in respect to the number of wings, and as shown in FIG. 3, has four wings 52 angularly spaced 90° apart, rather than two wings such as shown in FIG. 2.

There could be provided, instead of four wings, three wings, or even a number of wings larger than the four shown. The purpose of increasing the number of wings above the showing of FIG. 2 is to provide for a maximum distension of the mouth portion 50, when a splice is being inserted (see FIG. 4) as compared to the extent to which said mouth portion can be contracted about the cables in the fully installed condition of the device.

In FIG. 3, in full lines, we show the device in its normal condition, prior to installation. As in the first form of the invention, the wings are preformed so as to be distinctly present, contracting the mouth portion 50 to a diameter substantially less than the greatest diameter of the bulbous portion 26. This keeps the mouth portion small enough to facilitate its subsequent contraction about the cables, and yet large enough to also facilitate spreading of the wings when the splice is being inserted or removed. Note, thus, that in FIG. 4 the wings have been opened up to a point where they disappear completely, the mouth portion in FIG. 4 being shown at its greatest diameter to permit insertion of a large splice 18.

After insertion of the splice, the mouth portion is contracted tightly about the same, as shown in dotted lines in FIG. 3. In the dotted-line showing of FIG. 3, the wings 52 are folded over into engagement with the wall of the contracted mouth portion 50, and a tie element, not shown, can then be extended thereabout to maintain the mouth portion in cable-gripping engagement.

By folding over the wings, and then applying a tie element or clamp thereabout, the wings produce materially thickened areas which create pressure points directed radially inwardly of the mouth portion, tending to cause the mouth portion to be deformed into the interstices appearing between adjacent cables. This closes the mouth portion to a degree obviously sufficient to meet requirements. It may be noted, parenthetically, that the usual method of insulating a splice by taping the same does not in any way close up such interstices, because the tape does not deform itself into the interstices, leaving the same open to a substantial degree.

In the form of the invention shown in FIGS. 3 and 4, we show projections in the form of ribs 54, similar to those provided in the first form of the invention. At this point, it may be noted that in some embodiments of the invention, the spacing projections can be eliminated completely, if the matter of assuring air circulation, and increased rigidity of the bulbous portion 26 or 48, is not critical.

Referring now to FIG. 5, in this arrangement, the splice cover or insulating device can be either of the type shown in FIG. 1, or of the type shown in FIGS. 3 and 4. The type shown in FIG. 1 is illustrated by way of example, and receives the splice in the same manner as shown in FIG. 1. In this arrangement, however, the wings 32 are folded over to lie down against the side wall of the contracted mouth portion 28, after which a clamp 56 formed from a length of metal, or possibly from a length of a more flexible material such as nylon, is extended about the contracted mouth portion. Clamp 56 has spaced ears 58 receiving bolt and nut means 60 which, when tightened, close the mouth portion tightly about the cables, the folded-over wings deforming said mouth portion into the interstices appearing between the cables.

In FIG. 6 another modification is shown. In this form of the invention, generally designated 62, we show the invention applied to a through splice.

In this arrangement, the device is formed open at both ends, and has a bulbous center part 64 merging at opposite sides thereof into reduced, oppositely but identically formed end or mouth portions 66. At each end, wings 67 are formed, said wings being identical to the wings 32 or 52 in form, there being a pair of diametrically opposed wings in the illustrated example shown in FIG. 6. It will be understood that in the arrangement illustrated in FIG. 6, designed to accommodate a through splice, there could be three or four wings at each end, should this be desired.

As will be understood, the arrangement shown in FIG. 6 is such as to permit the device to be positioned over a through splice, said device being movable into splice-protecting position from either direction along the length of the cable. The splice has been designated 70, and would be of a conventional construction, as for example the arrangement shown in FIG. 1.

Also, it is possible to provide spacing projections upon the bulbous portion of the device, and these could comprise longitudinal ribs angularly spaced about the circumference of the bulbous part, similarly to the projections 42. However, to show a different type of projection, we have in FIG. 6 illustrated projections 65 in the form of small bumps, of generally circular form, spaced circumferentially and longitudinally of the bulbous part. The individual, rounded projections 65 could, should one so desire, be provided upon the closed-end form of the invention, instead of the ribs illustrated in FIG. 1, as will be readily appreciated.

Also, the means for contracting the mouth portions 66 about the cables, to close the splice cover at both ends, has been illustrated in FIG. 6 as the beaded plastic tie element 36. Here again, one could close the device at its opposite ends by folding the wings over as shown in FIG. 5, and then applying a clamp at each end such as shown at 56.

In FIGS. 7 and 8, we have illustrated a modified clamp means, capable of application to the mouth portion of any form of the invention hereinbefore illustrated and described. In this arrangement, the wings are folded down against the surface of the mouth portion, in the manner previously described herein. In this form of the invention, however, the clamp 72 includes a strap 74 having ears 76 apertured to receive the bolt and nut means 60, and having, also, a resiliently compressible lining 78 which in the illustrated example is of a sponge rubber material.

The strap 74 is preferably of a flexible nature, more flexible than a flat metal such as is more commonly employed in clamps of this type. We may provide, thus, a clamp strap 74 that is in the form of a wide strip of nylon or other plastic material. The advantage of such a strap is that it will automatically reshape or deform itself according to the general exterior cross-sectional shape of the mouth portion 28 having the folded-over wings 32.

In the arrangement shown, when the bolt and nut means is tightened, not only will the strap 72 conform generally to the exterior cross-sectional shape of the mouth portion, but also, the liner 78 will be compressed in varying degrees, according to the resistance encountered to its compression during the contraction of the clamp about the mouth portion. Thus, where the mouth portion is of maximum thickness, that is, where the ears or wings 32 are folded down, the liner will be compressed to a maximum degree, and will be so compressed that some of the liner material, being quite soft, will flow along the length of the strap, to fill up spaces in which there is more room, as for example, spaces such as shown at 80 in FIG. 8. The thicker material of the liner, in these spaces, tends to exert a pressure radially inwardly against the wall of the mouth portion, to force it into the interstices between adjacent cables.

In this way, we contract the mouth portion even more tightly about the cables, to prevent the admission of foreign matter in the spaces between the cables.

It will be understood that it is not necessary to completely seal the contracted mouth portion about the cables. This is not done in any instance wherein a device of the type illustrated and described would be employed. The device is used in electrical service entrances of buildings, and might be disposed in a corner of a basement portion of a commercial building, or at some other location. The device is used interiorly of the building, and is not necessarily of the type that must be completely weatherproof, and sealed against the admission of moisture. Nor is the device used in protecting underground splices, or splices that are mounted at locations at which they will become permanently inaccessible to all intents and purposes. The main importance of a splice cover of the type here under discussion is that it provides electrical insulation against the passage of high voltage current therethrough, and provides full protection against unauthorized individuals or objects coming into contact with bared wires. The cables illustrated carry more than the normal 120-volt AC house supply, in a typical installation, and hence it is very important that the splice cover be so designed as to provide maximum protection, at all locations over its area, against the passage of electrical current therethrough. In actual tests, a full size device of the type illustrated in FIG. 1 resisted voltage breakdown up to approximately 10,000 volts AC, far in excess of requirements by the usual building codes, or by authorized certifying or testing laboratories.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any changes in construction that may be permitted within the scope of the appended claims.

We claim:

1. A quickly applicable insulating device especially for a heavy duty electrical cable splice, comprising:
   (a) A thick-walled, hollow body of flexible, electrically insulative material formed with
      (1) a bulbous portion formed as the major portion of a hollow sphere having a smooth unbroken interior surface for enclosing a cable splice, said bulbous portion merging gradually into
      (2) at least one generally elongated, reduced open mouth portion through which the cables of said splice may extend, said mouth portion comprising a body part of generally circular cross-section the diameter of which is progressively reduced in a direction away from the bulbous portion, the interior of said mouth portion having a smooth surface merging into the interior surface of the bulbous portion, and
      (3) wings extending longitudinally of said mouth portion and formed with confronting integrally connected walls integrally joined to the wall of the mouth portion, each of said wings in cross-section being in the form of a V opening inwardly toward the mouth portion, the outer edges of the wings being straight and being extended parallel to the longitudinal axis of the body whereby said wings are progressively increased in depth in a direction away from the bulbous portion, said edges of the wings being spaced radially from the axis of the body a distance substantially equal to the radius of the bulbous porion whereby said wings merge at their inner ends into the bulbous portion at the point of greatest diameter thereof, the walls of wings being inherently resiliently tensioned to normally move the wings toward a closed condition thereof and thus radially contract the mouth portion to a diameter substantially less than the greatest diameter of said bulbous part, and said wings being spreadable to temporarily open said mouth portion for passage of the splice therethrough into the bulbous part; and
   (b) means surrounding the mouth portion and further contracting said mouth portion in a radial direction to close the same tightly about said cables.

2. An insulating splice as in claim 1 wherein there is at least one pair of said wings, located diametrically opposite each other.

3. An insulating device as in claim 1 wherein there is a plurality of said wings, angularly spaced about the circumference of said mouth portion at less than 90° intervals.

4. An insulating device as in claim 1 wherein said means comprises a tie element extending through registering apertures formed in the confronting walls of each wing, said tie element extending fully about the mouth portion and being drawable tightly thereabout, said tie element including portions interengaging in its tightly drawn condition to maintain the same in its drawn condition.

5. An insulating device as in claim 1 wherein said means comprises a clamp extending about the mouth portion and having means to contract the clamp radially to hold it in the contracted condition thereof.

6. An insulating device as in claim 5 wherein said clamp includes a strap having confronting ends across which said strap-contracting means extends.

7. An insulating device as in claim 6 wherein said strap is of a flexible material readily conforming generally to the exterior cross-sectional shape of the mouth portion, said wings being foldable over in closed condition with the strap wholly enclosing the mouth portion and wings, said clamp further including a resiliently compressible liner for the strap extending about the mouth portion and the folded wings, said liner conforming along its mouth-portion-contacting surface closely to the exterior cross-sectional shape of the mouth portion to exert pressure radially inwardly thereagainst effective to force the same into the interstices occurring between the spliced cables.

8. A quickly applicable insulating device especially for a heavy duty electrical cable splice, comprising:
   (a) a hollow body of flexible, electrically insulative material formed with
      (1) a bulbous portion for enclosing a cable splice,
      (2) at least one open mouth portion through which the cables of said splice may extend, and
      (3) wings extending longitudinally of said mouth portion and formed with confronting integrally connected walls integrally joined to the wall of the mouth portion, said wings being spreadable to temporarily open said mouth portion for passage of the splice therethrough into the bulbous part;
   (b) means for radially contracting said mouth portion tightly about said cables; and
   (c) projections angularly spaced about and extending outwardly from said body to space the same from surfaces of a space in which said body is confined.

References Cited

UNITED STATES PATENTS

| | | | |
|---|---|---|---|
| 1,096,537 | 5/1914 | Humphreys | 150—11 |
| 2,329,894 | 9/1943 | Hall. | |
| 3,209,061 | 9/1965 | Mier et al. | 174—5 |
| 3,255,794 | 9/1966 | Morse | 150—52 |
| 3,260,794 | 7/1966 | Kohler | 174—138 |
| 3,327,280 | 6/1967 | Levine et al. | 174—138 X |

FOREIGN PATENTS

| | | |
|---|---|---|
| 795,843 | 1/1936 | France. |
| 997,501 | 9/1951 | France. |
| 1,254,375 | 1/1961 | France. |

LARAMIE E. ASKIN, *Primary Examiner.*